United States Patent [19]

Foster

[11] 3,723,868

[45] Mar. 27, 1973

[54] SYSTEM FOR TESTING ELECTRONIC APPARATUS

[75] Inventor: Billy K. Foster, Winter Park, Fla.

[73] Assignee: General Dynamics Corporation, Rochester, N.Y.

[22] Filed: Jan. 21, 1972

[21] Appl. No.: 219,730

[52] U.S. Cl...............324/73 AT, 235/153 A, 324/133

[51] Int. Cl. ..........................................G01r 15/12

[58] Field of Search..............324/73 AT, 73 PC, 133; 235/153 A

[56] References Cited

UNITED STATES PATENTS

| | | | |
|---|---|---|---|
| 3,320,440 | 5/1967 | Reed | 235/153 A X |
| 3,614,608 | 10/1971 | Giedd et al. | 324/73 AT |
| 3,657,527 | 4/1972 | Kassabgi et al. | 324/73 PC |

*Primary Examiner*—Stanley T. Krawczewicz
*Attorney*—Martin LuKacher

[57] ABSTRACT

A printed circuit card tester for dynamically testing digital logic circuits on a visual GO/NO-GO basis is described. A repetitive set of waveforms is supplied to the circuit under test as stimuli therefor. Digital logic circuitry performs analysis of an output from the circuit under test which involved the counting of predetermined numbers of clock pulses during preselected timing intervals to determine the precise time interval between distinct edges (transitions) of the output from the circuit under test and to provide GO/NO-GO indications while the circuit under test is being dynamically exercised.

13 Claims, 3 Drawing Figures

Patented March 27, 1973 3,723,868

2 Sheets-Sheet 2

SYSTEM FOR TESTING ELECTRONIC APPARATUS

Figure 1:
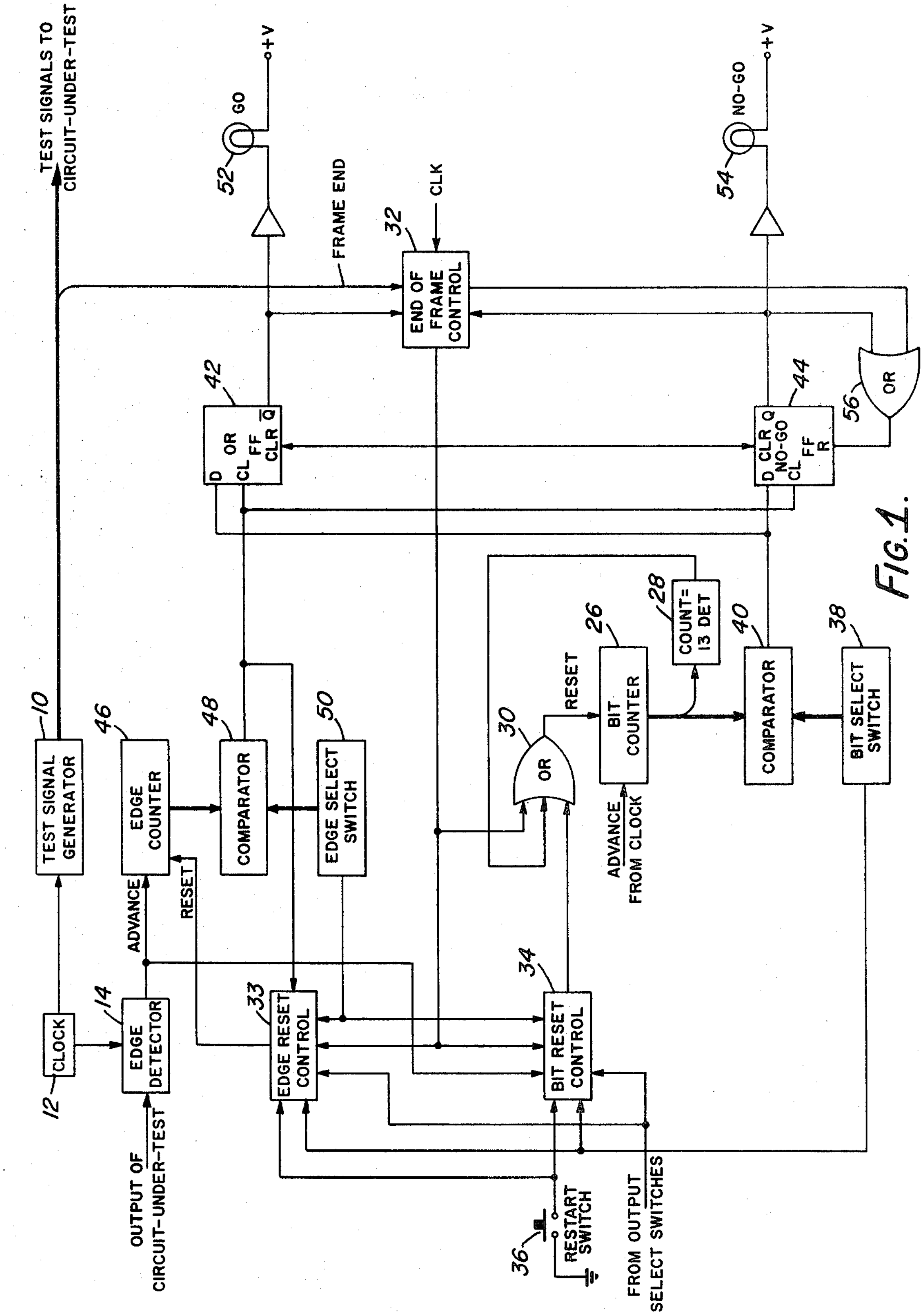

The present invention relates to systems for testing electrical apparatus and particularly to systems for dynamically testing electrical circuits.

The invention is especially suitable for use in a tester for digital logic circuits which may be contained in printed circuit cards or modules and is capable of exercising the card or module to perform logic functions so as to dynamically test the card and provide a GO indication or a NO-GO indication to quickly locate defective cards or modules.

It is presently the trend to design electrical and electronic apparatus to utilize modular plug-in functional elements, such as printed circuit boards. Servicing and maintenance then involves replacement of defective printed circuit boards. The circuit boards themselves may have many circuit functions and a multiplicity of inputs and outputs, thus engendering new problems in detecting faulty printed circuit cards and isolating the malfunctioning circuit or circuits of the cards so that they may be repaired.

Various approaches for testing of such printed circuit cards and modules have been proposed. The card or module may be tested while it is assembled or plugged in and operating in the system. Such test procedures are undesirable inasmuch as they contribute to the down time of the equipment while testing and analysis is being carried on. Separate test jigs and fixtures may be used to simulate inputs to the card or module while it is removed from the equipment. Very many of such test jigs and fixtures would then be required so as to individually test each card of different circuit configuration. The cost of maintaining an inventory of such test jigs and fixtures can be prohibitive. Another testing approach involves the use of duplicate printed circuit cards or modules. A large number of such duplicates would then be required and there is a finite probability that the duplicates themselves may not be in proper operating condition. Moreover, substitution of duplicate cards does not give information necessary for isolating a malfunctioning circuit of a faulty card so that it may be repaired. In an effort to overcome some of the foregoing problems computerized diagnostic systems have been proposed (see for example U.S. Pat. Nos. 3,142,328; 3,219,927; and 3,423,677). The expense of such computerized systems and the need for skilled technicians for their operation present substantial drawbacks.

It is therefore an object of the present invention to provide an improved system for testing electrical apparatus in which the foregoing problems, difficulties and disadvantages are substantially obviated.

It is a still further object of the present invention to provide an improved system for testing circuits or modules of various types and families which performs dynamic tests and provides GO/NO-GO indications of proper and faulty operation.

It is a still further object of the present invention to provide an improved system for testing digital logic circuit cards or modules which may be operated by relatively unskilled technicians.

It is a still further object of the present invention to provide improved GO/NO-GO detector circuits for analyzing the outputs of circuits under test.

Briefly described, a system embodying the invention has as its principal components: (a) a test signal generator, or pattern generator, which can input to the circuit under test a number of test waveforms which may be applied selectively or successively in a programmed manner to dynamically exercise the circuit; (b) two counters; and (c) GO and NO-GO indicator circuits. One of the counters counts pulses repetitive at a predetermined rate. The edges (transistions) of the selected output signals advance the other counter. Logic is provided for obtaining outputs from the counters and applying them to the GO and NO-GO indication circuits; a GO indication being provided when the counters simultaneously provide their outputs and a NO-GO indication when simultaneous outputs from the counters are not provided. A fault is thus detected when distinct edges (transitions) of the output signals of the circuit being tested do not occur between selected time intervals. Inasmuch as the input waveform to the circuit under test, the output from that circuit, and the intervals between transitions can be selectively programmed, various types of circuits can readily be tested, faulty components and individual circuits isolated all by a single testing system which can be operated by a relatively unskilled technician.

Figures 2, 3:
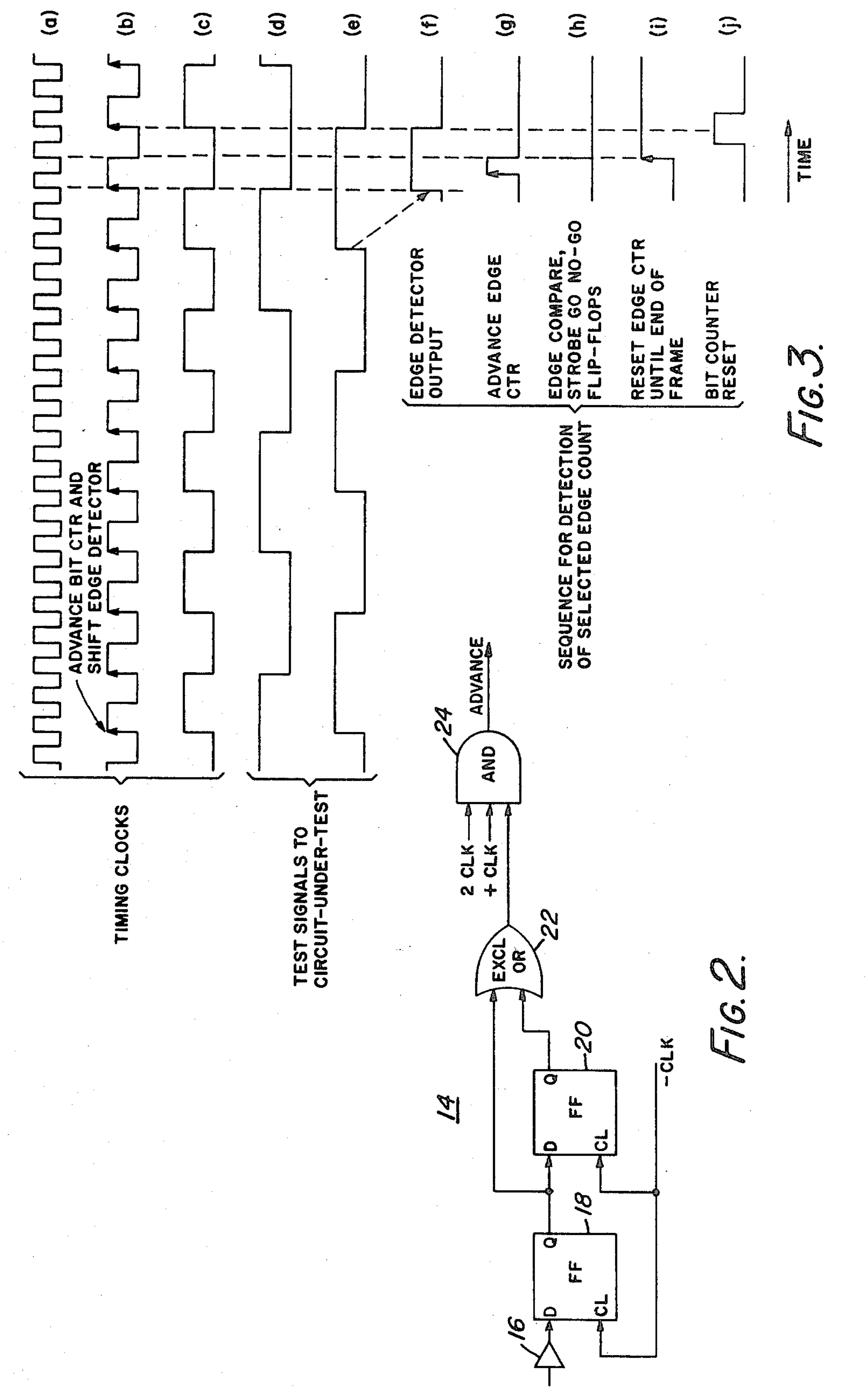

The invention itself both as to its organization and method of operation, as well as additional object and advantages thereof will become more readily apparent from a reading of the following description taken with the accompanying drawings in which FIG. 1 is a block diagram of a testing system embodying the invention;

FIG. 2 is a block diagram of the edge detector circuit of the system shown in FIG. 1; and FIG. 3 is a group of waveforms illustrative of the operation of the system shown in FIG. 1.

Referring now to FIG. 1, a test signal generator 10 provides a plurality of test waveforms (patterns) to the circuit under test. Two of these test waveforms (patterns) are illustrated in waveforms (*d*) and (*e*) in FIG. 3. The test signal generator 10 is driven by pulses from a clock 12. The clock 12 is a clock oscillator which drives a divider to produce a plurality of timing clocks as illustrated in waveforms (*a*), (*b*) and (*c*) in FIG. 3. The test signal (patterns) generator includes a divider (an eight stage binary counter) which provides eight of the test signal waveforms, and decoding logic connected to a plurality of the counter stages to produce additional test signals. The decoder in the test signal generator 10 also provides a frame end pulse to mark the repetition periods of the slowest changing test signal; therefore, in the interval between successive frame end pulses a complete cycle of all test signals (patterns to the circuit-under-test) combinations have occurred. Such decoders may be conventional combinations of gates which are strobed or trued by the fastest rate timing clock (the clock shown in waveform (*a* )) so as to provide for coherent timing operation with the clock.

The circuit under test is for example a printed circuit card having transistors, integrated circuits or the like thereon for performing digital logic functions. The card has a row of contacts along one or more edges thereof to which printed circuit connections are made. These contacts receive inputs and provide outputs during the normal operation of the card when used in other equipment. The circuit tester has a connector for receiving the card and providing the test signals from the test signal generator 10 to the card inputs. Outputs are obtained from the connector and are processed in the tester to obtain GO/NO-GO indications as to whether or not the circuit under test is functioning according to its design requirements. Each output from the printed circuit card under test is selected manually by the operator and dynamically exercised by the waveforms applied as test signals to the circuit under test. The circuit is thus dynamically exercised and accurately measured to determine the validity of the output signals.

In order to provide the desired combination of test signals a programmer (not shown) may be inserted between the test signal generator and the circuit under test. In a preferred form the programmer includes a reader for punched (Hollerith) cards which provides a 12 by 80 matrix to distribute different combinations of test signals from the generator to the inputs of the card under test. The card reader matrix also provides for the selected application of power supply voltages and output loads to the inputs and outputs of the printed circuit card under test. Inasmuch as punched card controlled switching matrices are known in the art (see for example U.S. Pat. No. 3,219,927), it is not described in detail herein.

The selected output from the circuit under test as obtained from the output select switches is applied to an edge detector 14 which detects each transition, either from high level to low level, or from low level to high level in the selected output from the circuit under test. As shown in FIG. 2 the edge detector 14 includes a buffer amplifier 16 which applies the output of the circuit under test to the D or steer input of one of a pair of flip-flops 18 and 20 which are connected as a two-stage shift register and are strobed at the bit rate by the inverted bit rate timing clock (waveform (*b*) FIG. 3). The outputs of both flip-flops 18 and 20 are connected to the inputs of an exclusive OR gate 22 which functions as a comparator. The gate 22 thus provides an output whenever the flip-flops are in different states (flip-flop 18 reset and flip-flop 20 set or vice versa) as will result from a level change (transition) in the output of the circuit under test when that output is shifted into the flip-flop 18 by the inverted clock pulses. When such a transition is detected the exclusive OR gate 22 enables an AND gate 24 which is strobed by the clock pulses at the bit rate and the clock pulses at twice the bit rate (waveform (*a*) FIG. 3). Accordingly the edge detector will provide at the output of the gate 24 a pulse of duration equal to one half the bit period. A typical output from the exclusive OR gate 22 upon occurrence of a transition in waveform (*e*) FIG. 3 is shown in waveform (*f*). The half bit period output pulse produced by the AND gate 24 is shown in waveform (*g*).

The bit period referred to above is selected as being the shortest period between a transition of any test signal from the generator 10 and any other test signal therefrom. In other words, the bit period is the shortest interval over which two successive changes (transitions) in stimuli (in the test signal waveforms) to a circuit under test can occur. Therefore, the bit rate may be thought of as the test signal pattern rate. Accordingly, the circuit under test can produce no more than one transition in its output during a bit period in response to test signals from the test signal generator 10.

A bit counter 26 counts bit periods by being advanced by clock pulses at the bit rate. This bit counter contains four flip-flop stages and includes a decoder 28 which detects when 13 clock pulses are counted. The output of the decoder is applied via an OR gate 30 to the reset input of the counter 26 and causes the counter 26 to recycle to zero every thirteenth count. The 13:1 counter recycle rate should be taken merely as illustrative of a suitable recycling rate. The counter is also reset to ZERO at the end of each frame by an output from the end of frame control logic 32, which contains gates for transferring clock pulses to the reset input of the bit counter 26 via the OR gate 30 on occurrence of frame end pulses from the test signal generator 10. Associated with the bit counter 26 and edge counter 46 are reset controls 34 and 33 respectively. These controls consist of flip-flops and gates for providing sufficiently long reset pulses to reset their respective counters, and in the case of the control 33 until the end of the frame, as discussed hereinafter.

The bit counter 26 may also be reset when the edge detector 14 detects a transition in the card under test output, which has the effect of re-starting the bit counter 26 at count zero, resulting in defining the bit position of an edge by the bit counter 26 in terms of the number of bit counter clock pulses between successive edges. Such a reset pulse is shown in waveform (*j*) of FIG. 3. As an alternate approach, the edge detector 14 advance may not be used to reset the bit counter 26, resulting in defining the bit position of an edge by the bit counter 26 in terms of the number of bit counter clock pulses that occur from the end of the previous frame. Reset controls are also provided which affords a reset pulse for resetting the bit counter 26 and the edge counter 46 whenever the restart switch 36 is actuated or whenever any manual control function of the tester, such as actuation of the outputs select switches, or any other switches is performed.

Associated with the bit counter is a bit select switch 38 which may be an encoding switch or switch-controlled digital circuits for producing a sequence of levels corresponding to the 13 different states which the counter may reach in a counting cycle.

The comparator 40 may include a group of gates which are enabled when the count reached by the bit counter corresponds to the code established by the bit select switch 38. Thus the comparator 40 then produces a high level which is applied to the steering or D inputs of a GO flip-flop 42 and a NO-GO flip-flop 44. These flip-flops are strobed in order to provide GO and NO-GO indications indicative of the presence or absence of a fault in the circuit under test.

An edge counter 46 which may be similar to the bit counter 26 in that it has four flip-flop stages and is advanced by the output pulses from the edge detector 14. Associated with the edge counter is a comparator 48 and an edge select switch 50. The switch 50 may be similar to the switch 38 and the comparator 48 similar to the comparator 40. The comparator 48 generates an output pulse for strobing the flip-flops 42 and 44 when a selected edge count is reached (upon occurrence of a selected number of transitions after the end of the previous frame). This strobing pulse is illustrated in waveform (*h*) of FIG. 3. The output pulse from the comparator 48 is also applied to the reset control 33 which may contain a flip-flop which is latched upon the comparator 48 pulse occurrence until the end of the frame in order to preclude successive operation of the edge counter once an output pulse is produced by the comparator 48. The reset pulse to the edge counter will therefore be of the form shown in waveform (*i*) of FIG. 3, upon occurrence of a comparator output pulse during a frame.

It will be noted that inputs to the reset controls 33 and 34 from the edge select switch 50 the bit select switch 38 or the output select switches effect a reset operation thereby eliminating the need for the operator to press the restart button 36. In the reset condition, the GO flip-flop 42 is reset and the $\bar{Q}$ is at a high level causing the GO lamp 52 to be extinguished; also in the reset condition, the NO-GO flip-flop 44 is set and the Q output is at a high level causing the NO-GO lamp 54 to be extinguished If after resetting an edge comparator output does occur during a selected bit count, the GO flip-flop 42 is set. The $\bar{Q}$ output of the GO flip-flop 42 will then be at a low level permitting current to flow through the GO indicator lamp 52. Inasmuch as the Q output of the NO-GO flip-flop 44 remains high no current will flow through the NO-GO indicator lamp 54. Conversely if the selected edge occurs during a bit period other than that selected, the NO-GO flip-flop 44 resets, (the steering or D input to the flip-flops 42 and 44 will be at low level rather than high level). The Q output of the NO-GO flip-flop 44 will be at low level and the NO-GO lamp 54 will light.

The NO-GO flip-flop latches itself into the reset condition via an OR gate 56 thus providing a positive indication of a fault condition until the system is cleared by a reset pulse from the reset control to the clear inputs of both flip-flops 42 and 44. In the event that the end of a frame is reached without either a GO indication or a NO-GO indication, which is probably indicative of an inoperative circuit under test, a NO-GO indication is automatically forced by an output to the OR gate 56 from the end of frame control 32. Also, the GO and NO-GO lamps are interlocked as by relays (not shown) to preclude a GO indication when a NO-GO has been generated.

From the foregoing description it will be apparent that there has been provided an improved system for dynamically testing electrical apparatus particularly digital logic modules and printed circuit cards. The system has been described in connection with a manually operable group of switches for selecting different test conditions. It will be appreciated of course that such switches (the edge select switch and bit select switch)may be programmed to operate automatically to establish successive test conditions during successive frames. Then the operator need only insert the punch card and press the restart button to execute a complete test of any card. Other variations and modifications within the scope of the invention will obviously suggest themselves to those skilled in the art. Accordingly, the foregoing description should be taken merely as illustrative and not in any limiting sense.

What is claimed is:

1. A system for testing electrical apparatus which comprises a. means for generating repetitive test signal and applying said signal to said apparatus so that said apparatus operates in response to said signal to produce a first output,
b. first counter and a second counter,
c. means for advancing said first counter at a predetermined rate,
d. means for advancing said second counter in response to said output,
e. means for providing second and third outputs respectively from said first and second counters respectively when said first and second counters are advanced to first and second counts, and
f. means responsive to said second and third outputs for enabling a "go" indication when said second and third outputs occur simultaneously and for enabling a "no-go" indication when said second and third outputs do not occur simultaneously.

2. The invention as set forth in claim 1 wherein said apparatus is an electrical circuit having multiple inputs and wherein said generating means includes means for generating a plurality of said test signals and applying them to said circuit inputs.

3. The invention as set forth in claim 2 wherein said electrical apparatus is a digital circuit and said means included in said generating means provides a plurality of square waves having transitions from high to low level which have different time relationships with respect to each other.

4. The invention as set forth in claim 1 including means responsive to said output for resetting said first counter.

5. The invention as set forth in claim 1 wherein said advancing means includes means for detecting transitions in said first output and generating a pulse for advancing said second counter upon detection of each of said transitions.

6. The invention as set forth in claim 5 wherein said transition detecting means includes first and second flip-flops adapted to be in set or reset states when clocked depending upon the level of signal applied thereto being high or low, and having outputs which are high or low level depending upon the set or reset condition thereof, said first output being applied to the input of said first flip-flop, and said first flip-flop output being connected to said second flip-flop input, means for clocking said flip-flops at a first rate, and means for providing said pulse during each clock interval when said first and second flip-flops are not in the same state.

7. The invention as set forth in claim 6 wherein said pulse providing means is an exclusive OR gate input connected to said first and second flip-flop outputs, and a gate having separate inputs for receiving input pulses at said clock pulse rate, pulses at a rate higher than said clock pulse rate, and for the output from said exclusive OR gate.

8. The invention as set forth in claim 1 wherein said means for providing said second and third outputs includes a first comparator and a second comparator, and first and second switching means for selectively inputting different digital numbers respectively into said first and second comparator corresponding to different counts whereby to enable said comparators to provide said second and third outputs when said first and second counters are advanced to store counts equal to said numbers.

9. The invention as set forth in claim 1 wherein said means for enabling said "go" and "no-go" indications comprise a first flip-flop and a second flip-flop, means for applying said second output to steer said flip-flops both to one state when strobed, and means for applying said third output to both said flip-flops to strobe said flip-flops.

10. The invention as set forth in claim 9 wherein said flips-flops each have complementary outputs, a "go" indicator, a "no-go" indicator, and means for coupling said "go" indicator and said "no-go" indicator respectively to one of the outputs of said first flip-flop and to one of the outputs of said second flip-flop, said one output of said first flip-flop being complementary to said one output of said second flip-flop when said flip-flops are in the same state.

11. The invention as set forth in claim 1 wherein said electrical apparatus is a digital circuit having a plurality of inputs and wherein said generating means includes means for generating a plurality of square wave test signals which have transitions in level between two levels which transitions in different ones of said test signals occur in certain time relationship, and said means for advancing said first counter includes means for applying clock pulses to said second counter having a period less than the shortest interval between the transitions of different ones of said test signals.

12. The invention as set forth in claim 11 including means for resetting said first counter when it reaches a predetermined count.

13. The invention as set forth in claim 11 including means for resetting said first and second counters after the end of the period between successive transitions of the one of test signals having the longest period between transitions of any of said test signals.

* * * * *